US006845412B1

(12) United States Patent
Boike et al.

(10) Patent No.: US 6,845,412 B1
(45) Date of Patent: Jan. 18, 2005

(54) METHOD AND SYSTEM FOR A HOST PROCESSOR TO BROADCAST DATA TO INSTRUCTION OR DATA MEMORIES OF SEVERAL PROCESSORS IN A MULTI-PROCESSOR INTEGRATED CIRCUIT

(75) Inventors: Mark A. Boike, Plano, TX (US); Alan Phan, Rowlett, TX (US)

(73) Assignee: LSI Logic Corporation, Milpitas, CA (US)

( * ) Notice: Subject to any disclaimer, the term of this patent is extended or adjusted under 35 U.S.C. 154(b) by 442 days.

(21) Appl. No.: 10/045,889

(22) Filed: Nov. 7, 2001

(51) Int. Cl.$^7$ ................................................ G06F 3/00
(52) U.S. Cl. ........................................ 710/36; 711/100
(58) Field of Search ........................... 710/36; 711/100, 711/144, 154; 712/1, 10

(56) References Cited

U.S. PATENT DOCUMENTS

| | | | | |
|---|---|---|---|---|
| 5,237,670 A | * | 8/1993 | Wakerly | 710/100 |
| 5,890,006 A | * | 3/1999 | Tran et al. | 712/1 |
| 5,968,114 A | * | 10/1999 | Wentka et al. | 718/100 |
| 6,003,120 A | * | 12/1999 | Hardin | 711/169 |
| 6,212,610 B1 | * | 4/2001 | Weber et al. | 711/164 |
| 6,353,874 B1 | * | 3/2002 | Morein | 711/118 |
| 6,553,525 B1 | * | 4/2003 | Shephard, III | 714/733 |

\* cited by examiner

*Primary Examiner*—Kim Huynh
*Assistant Examiner*—Harold Kim
(74) *Attorney, Agent, or Firm*—Daffer McDaniel L.L.P.

(57) ABSTRACT

A system and method are presented for an external host processor to distribute data to memory devices associated with multiple digital signal processors (DSPs) within an integrated circuit "system on a chip." A host processor interface in the multi-processor integrated circuit responds to commands from the host processor and provides access to the memory devices. A control register in the interface is directly accessible by the host processor, and is used to generate various control signals in response to host processor commands. A data control register in the interface has a field of write enable bits that directly control write accessibility of the memory devices—if a designated write-enable bit within the data control register is set, the corresponding memory devices are write enabled. An extended address bit in the control register is used to select either instruction or data memory for write access.

21 Claims, 5 Drawing Sheets

METHOD AND SYSTEM FOR A HOST PROCESSOR TO BROADCAST DATA TO INSTRUCTION OR DATA MEMORIES OF SEVERAL PROCESSORS IN A MULTI-PROCESSOR INTEGRATED CIRCUIT

BACKGROUND OF THE INVENTION

1. Field of Invention

This invention relates to digital integrated circuit design, and more particularly, to techniques for improved efficiency of operation of multi-processor digital integrated circuits.

2. Description of Related Art

Progress in semiconductor manufacturing has both improved the performance of transistors and other semiconductor devices and brought about a tremendous reduction in their size. The small size of semiconductor devices is advantageous because it allows large numbers of transistors to be combined in highly complex integrated circuits, such as microprocessors. For example, the first microprocessor, Intel 4004, introduced in 1971, combined approximately 2,000 transistors on a single chip. In comparison, the Pentium III®, a typical modem high performance microprocessor, contains over 28 million transistors. With the capability for very high levels of integration, it has become possible to create systems on a chip, in which entire functional modules ("subsystems") are combined on a single semiconductor substrate. Each of these subsystems may contain a processor with its own dedicated memory resources and peripheral devices.

The subsystems in multi-processor integrated circuits often operate synergistically, sharing buses and/or memory resources for enhanced performance. This can be especially useful in applications involving multiple tasks that can be performed in parallel. Such applications are common enough in the fields of signal processing and communications that semiconductor manufacturers have introduced special purpose signal processing integrated circuits containing four or more processors.

Because of the high level of complexity in a multi-processor integrated circuit, the coordination of its various system components can prove difficult. Among the system management functions that must be dealt with in a multi-processor integrated circuit are the initialization of program and data memory and the configuration of on-chip peripheral devices.

It is common in a multi-processor integrated circuit for each subsystem to have a processor with its own memory resources and peripheral devices, such as timers or serial ports. In one type of multi-processor integrated circuit, the internal processors are digital signal processors (DSPs), which use separate memories for data and for instructions. DSPs are special purpose processors, optimized for numerical calculations and array manipulation, as commonly encountered in signal processing applications. DSPs typically operate at very high speeds, and may perform multiple operations in a single clock cycle. The data memory for a DSP may contain filter coefficients for a digital filter, while the instruction memory contains the actual program executed by the DSP. Depending on the type of memory devices used, the data or instructions may be retained permanently (non-volatile memory) or only while power is applied to the integrated circuit (volatile memory). Non-volatile memory can be used for storing data or program instructions that never change—such as the coefficients for an industrial process controller. If the program code for a processor is placed in non-volatile memory, the processor can begin execution immediately as soon as it receives power, without waiting for the program code to be loaded into memory. There are limitations to this approach however. Non-volatile memory is a poor choice if the program or data must regularly be modified, since write speeds are generally slower for non-volatile memory devices such as flash or EEPROM, than for conventional memory. Furthermore, non-volatile memory is expensive and may occupy too much of the available area on the semiconductor substrate.

Therefore, volatile memory is most commonly used in multi-processor integrated circuits. Since volatile memory does not retain its contents in the absence of power, when the multi-processor integrated circuit is first powered-up its memory is empty and must be loaded with instructions and/or data before the multiple internal processors are allowed to begin execution. To load the memory, it must be active—i.e., power must be applied to the memory and its address and data lines must be operational. However, since an internal processor and its memory share the same substrate, they both become active when power is first applied to the integrated circuit. It is therefore necessary to prevent the processor from executing until its program has been loaded into memory—otherwise, the internal processor will retrieve only random data from the memory, rather than meaningful instructions. This is typically accomplished by holding the internal processor in reset mode while the memory is loaded, then allowing it to begin execution (by releasing the reset) once the instructions are in place. A prolonged reset permits both the internal processor and its memory to be in an active state, but the internal processor is idle until valid program instructions are available. Once the host processor has initialized the memory for each of the subsystems in a multi-processor integrated circuit, it removes the reset condition, allowing the internal processors to simultaneously begin operation.

An interface may exist to allow access to memory resources of the processors. The interface operates as a port to the integrated circuit upon which the processors reside. A limitation of conventional interfaces is that a subsystem external to the integrated circuit can access the memory resources of only one processor at a time. Consequently, the loading of instructions and data for one processor must be completed before it can be performed for another processor, even when the instructions and data are the same for all the processing subsystems. Depending on the speed of the interface and the amount of data to be loaded, this can represent a substantial startup time for the multi-processor integrated circuit.

In view of this limitation, it would be desirable to simultaneously load instructions or data into the memory of several processing subsystems in a multi-processor integrated circuit. The memory loading should preferably be accomplished under the control of a host (i.e., a manager) processor via an enhanced interface. By loading all the memories at once, startup time could potentially be reduced by a factor equivalent to the number of subsystems—subject to the assumption that the instructions and/or data are the same for all of the subsystems. In many cases this assumption is justified, since multi-processor integrated circuits are often used for signal processing applications consisting of identical tasks that can be performed in parallel.

SUMMARY OF THE INVENTION

The problems outlined above are in large part addressed by a system and method for simultaneously distributing data to multiple subsystems in a multi-processor system on a chip. Each subsystem may consist of a processor with its own instruction memory, data memory and various peripheral devices. The term "broadcasting" is used herein to refer to the simultaneous distribution of data to the memory in one or more (possibly all) of the subsystems contained on the single monolithic substrate.

The system and method disclosed herein allow a host processor to control the transfer of data to the instruction memory or data memory of any or all of the subsystems. Thus, if the instructions or data are the same for all of the subsystems, they may be placed into memory in a single transfer. In this case, a significant improvement in startup time can be obtained relative to current methods, which require the memory for each subsystem in the integrated circuit to be loaded separately.

A system is presented, consisting of a host processor, multiple secondary processors, each of which is equipped with a data memory and an instruction memory, and an interface to a host processor. The secondary processors, their associated data and instruction memories, and the interface all reside on a common semiconductor substrate, as a system on a chip. The host processor is external to the multi-processor integrated circuit, and interacts with the multi-processor integrated circuit through the interface. The interface contains a control register and a data control register. The control register can be written to and read by the host processor. The data control register "shadows" the control register—i.e., designated bits within the control register can be automatically copied to the data control register. The copied bits in the data control register directly control individual write request lines to the memories associated with each of the processors. If one of these bits is active, the memories of the respective secondary processor are selected. An extended address bit in the control register controls the selection of either the data memories or the instruction memories. Depending on the state of the extended address bit in the control register, the data control register bits enable write access to either the data memory or the instruction memory of any combination (including one or all) of the processors in the multi-processor integrated circuit.

Using the interface, the host processor is able to write data to a common data bus shared by all of the memory devices. By selectively enabling the memories, the host processor can distribute data or instructions to the memory devices of any or all of the secondary processors by setting the appropriate bits in the control register. When the bits from the control register are copied to the data control register, write request signals are applied to the corresponding memory devices, enabling the designated memory devices for write access. The data placed on the data bus host by the processor is then simultaneously transferred into each of the enabled memory devices.

A method is also presented whereby a host processor can distribute data to memories associated with multiple processors within a multi-processor integrated circuit. In an embodiment of the method, the host processor writes to bits in a control register, thereby selecting which memory devices are to jointly receive data presented on a data bus. The bits in the control register are then automatically copied to a data control register, in which the state of each bit directly controls the write enable status of a corresponding memory device. In an embodiment of the method, the host processor transfers data to either instruction memory devices or data memory devices, by setting or clearing an extended memory bit within the control register. Instruction memory typically contains program code for the multiple processors, while data memory may contain configuration parameters for on-chip peripheral devices. Furthermore, automatic copying of the bits from the control register to the data control register depends on the logic state of an enable bit in the control register, which can be set or cleared by the host processor.

The method is believed to be valuable during the initialization of the multi-processor integrated circuit by the host processor, when program instructions or configuration data must be written into the memories of multiple processors within the multi-processor integrated circuit. Advantageously, the present method allows the host processor to simultaneously transfer data to multiple memories, rather than writing the data to each memory individually.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A system and method are presented whereby an external processor can control the distribution of data to multiple processors within a multi-processor integrated circuit, commonly known as a system on a chip. In an embodiment of the system and method, the multiple internal processors are accessed by an external processor through a host processor interface port on the integrated circuit. Through the use of special registers in the interface, the host processor is able to distribute data simultaneously to any combination of the processors, rather than being forced to transmit the data to each processor separately. Throughout the remainder of this document, the term "broadcast" will be used to refer to the simultaneous distribution of data by the host processor to memories associated with one or more internal processors within a multi-processor integrated circuit.

Figure 1:
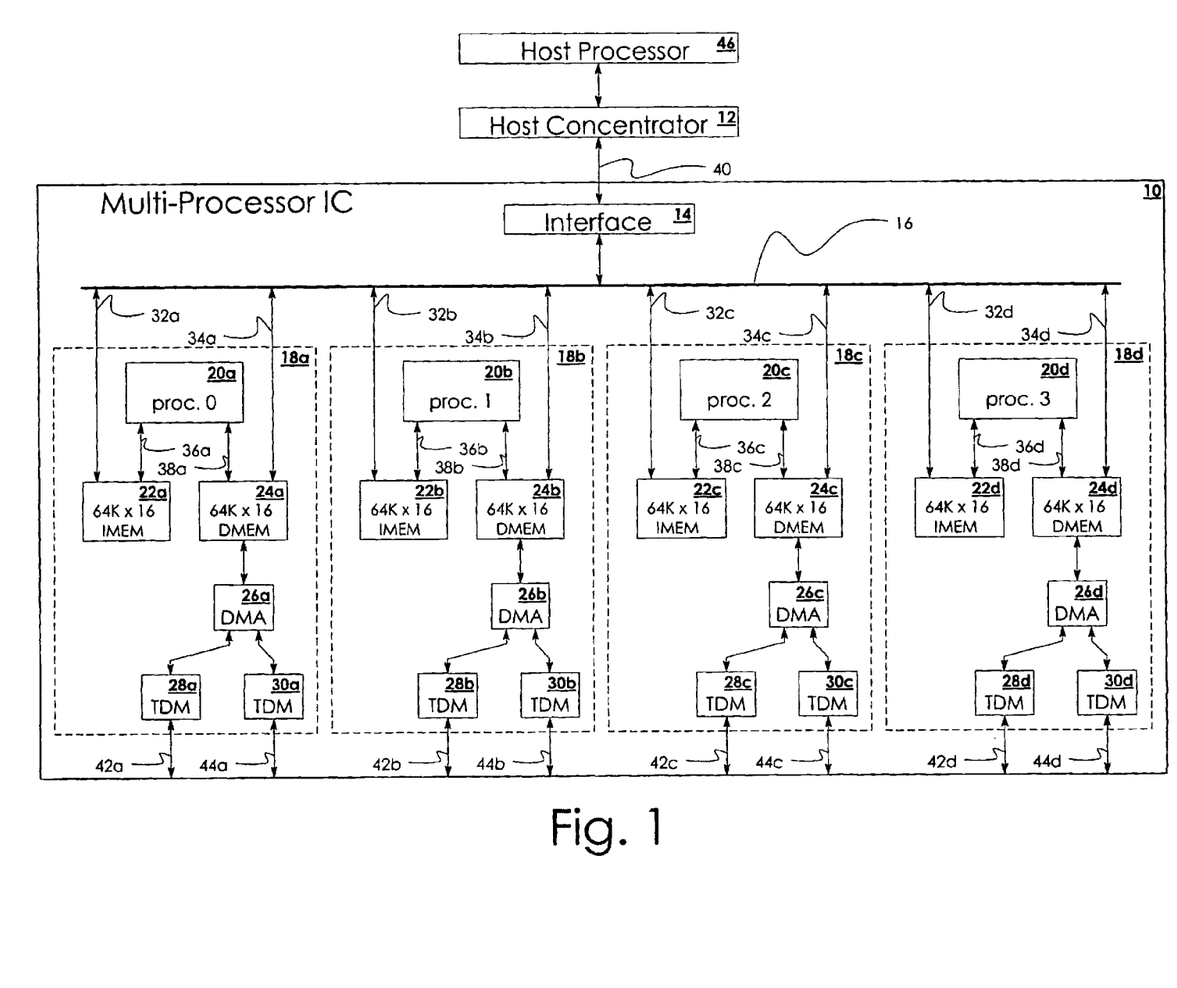
FIG. 1 is a block diagram of a system on a chip embodying the present system and method for data broadcasting.

FIG. 1 represents a multi-processor integrated circuit 10. The multi-processor integrated circuit 10 receives commands and data from a host processor 46 through a host concentrator 12, which interfaces to the multi-processor integrated circuit via a port 40. According to one example, the multi-processor integrated circuit 10 is employed to process and direct voice traffic in a communications system, and the host concentrator 12 routes voice data packets, along with data and commands from the host processor 46 to the multi-processor integrated circuit 10. The multi-processor integrated circuit 10 contains an interface 14 to the host processor, which provides access to four internal subsystems 18*a–d* within the multi-processor integrated circuit. Each subsystem contains a processor (proc. 0–proc. 3) 20*a–d*. In one example, the processors can be digital signal processors based on a Harvard architecture, which employs separate memory spaces for instructions (i.e., program) and for data. The processor in each of the four subsystems has its own instruction memory 22*a–d* and data memory 24*a–d*, which interface to the processor over separate instruction and data memory buses 36*a–d* and 38*a–d*, respectively. Also associated with the processor in each subsystem are a direct memory access (DMA) controller 26*a–d*, and a pair of time division multiplexed (TDM) serial ports 28*a–d* and 30*a–d*. Serial ports 28*a–d* and 30*a–d* receive and transmit voice data packets over serial connections 42*a–d* and 44*a–d* (e.g., a standard T1 telephone communications link). Correspondingly, the DMA controller 26*a–d* in each subsystem 18*a–d* allows the respective serial ports to access the data memory 24*a–d* without diverting the associated processor 20*a–d* from its signal processing tasks.

A common internal bus 16 connects the interface 14 to the instruction and data memories in all four subsystems. Each of the instruction and data memories is accessed from the common bus 16 by its own individual bus 32*a–d* and 34*a–d*. By means of this bus structure, the interface 14 provides the host processor 46 access to the instruction memory and data memory in each of the subsystems 18*a–d*. Using the interface, it is possible for the host processor to place program instructions (e.g., an echo canceling algorithm) into the instruction memory of the processors, and to place data (e.g., digital filter coefficients) into the data memory of the processors. This is typically done during the initialization and configuration of the multi-processor integrated circuit by the host processor, immediately following the application of power to the integrated circuit. Initialization is generally necessary because memories 22*a–d* and 24*a–d* are typically "volatile"—i.e., they do not retain instructions or data when power is removed. Consequently, if power to the multi-processor integrated circuit is turned off, the contents of these memories must be restored when the integrated circuit is activated again. During the initialization process the processors may be held in reset, so that they do not attempt to execute program instructions from the instruction memory. Once the host has completed initialization, the processors are released from reset to begin normal execution. In addition to program instructions and data required by the processors, the DMA controllers 26*a–d* and TDM serial ports 28*a–d* and 30*a–d* may rely on configuration data contained in data memories 24*a–d*, which must also be established by the host processor 46 during initialization.

Figure 2:
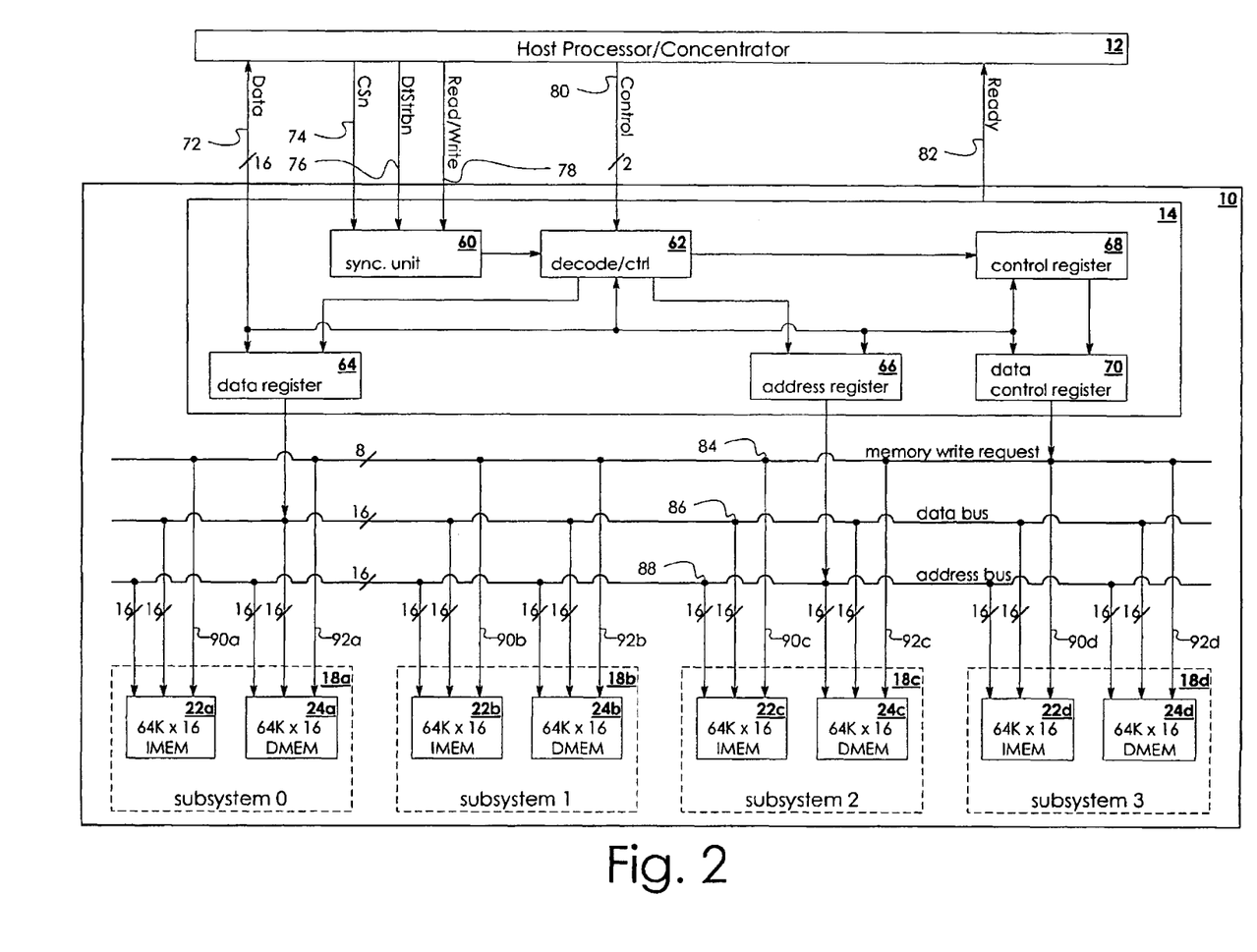
FIG. 2 is a block diagram illustrating the paths taken by data and control signals in the multi-processor integrated circuit of FIG. 1.

FIG. 2 represents a more detailed view of the interface and the bus structure, illustrating data and signal paths within the multi-processor integrated circuit. The signals comprising the interface between the host concentrator and the interface (items 40, 12, and 14, respectively, in FIG. 1) are also shown. For simplicity, the host processor itself (item 46 in FIG. 1) is omitted from FIG. 2. Likewise, the processor, DMA and both TDM serial ports (items 20*a–d*, 26*a–d*, 28*a–d*, and 30*a–d* in FIG. 1) in each of subsystems 0–3 (items 18*a–d* in FIG. 1) are not shown. Within the interface 14 is a sync. unit 60, which synchronizes incoming chip select 74, data strobe 76 and read/write 78 signals from the host concentrator 12 to a master clock in the multi-processor integrated circuit 10. A 2-bit control bus 80 conveys commands from the host concentrator 12 to an instruction decoder 62 in the interface. These commands are used to program a control register 68, which manages the broadcasting of data to the instruction and data memories in the four subsystems, as described in detail below. Both instructions and data are conveyed over 16-bit data bus 72 to a data register 64 in the interface. From the data register 64, the data and instructions are distributed to the memories, with memory addresses provided by address register 66 and individual memories selected by data control register 70. The interface 14 responds to commands and data from the host concentrator 12 with a ready signal 82.

The instruction 22*a–d* and data 24*a–d* memories in each of subsystems 0–3 (items 18*a–d* in FIG. 1) in the multi-processor integrated circuit embodiment shown in FIG. 2 consist of 64K (i.e., 65,536) 16-bit words. Since there are four subsystems and two memories in each subsystem, a total of 8 write enable lines, 90*a–d* and 92*a–d*, is needed to individually select these memories. These write enable lines comprise 8-bit memory write request bus 84. Instructions and data are distributed over 16-bit data bus 86, while the 64K memory locations in each of the instruction 22*a–d* and data 24*a–d* memories are accessed using 16-bit address bus 88. The 16-bit address bus 88 and the 16-bit data bus 86 are connected to each of the instruction 22*a–d* and data 24*a–d* memories in all four subsystems 18*a–d*. Consequently, when data is presented on data bus 86 and an address is presented on address bus 88 the data will be written to the addressed location in every memory device for which the write request line 90*a–d* and 92*a–d* is active. For example, if binary address 0100000000000000 is asserted and write request lines 90*b* and 90*c* are active, then the binary value present on data bus 86 will be written to location 0100000000000000 in instruction memories 22*b* and 22*c*.

Note that, although both are transferred using the data bus 86, there is an essential difference between instructions and data. An instruction is a binary sequence that represents a command executable by any of the processors in the multi-processor integrated circuit. Data, on the other hand, is a binary sequence that represents a numeric quantity, and not a valid processor command. Consequently, it would be improper to write instructions into data memory, or data into instruction memory. Therefore, the instruction memory write request lines 90*a–d* and data memory write request lines 92*a–d* should never be simultaneously active. The present system and method for broadcasting data to multiple processors in a multi-processor integrated circuit precludes this condition, as described in detail below.

Figure 3:
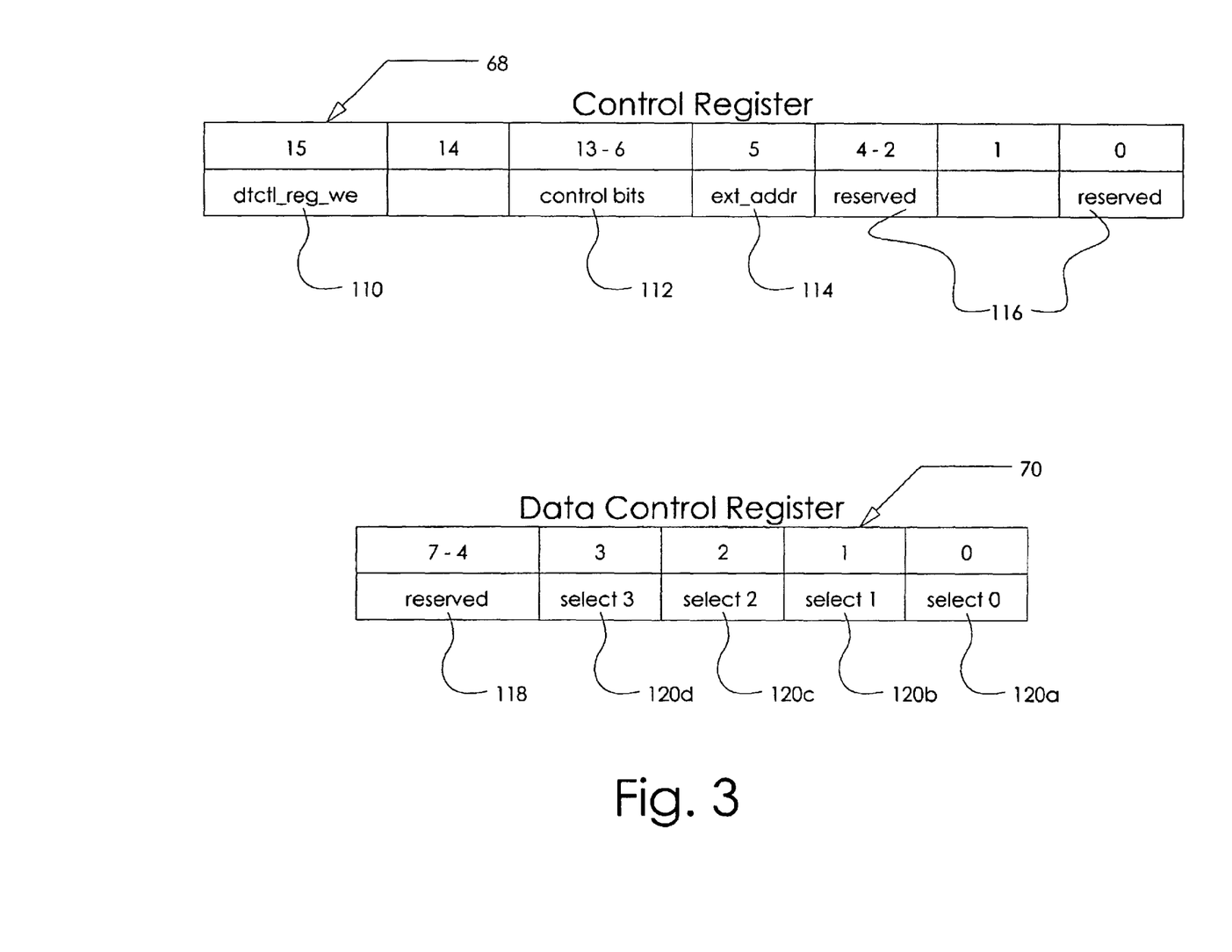
FIG. 3 is a block diagram of bit fields placed in control register by a host processor to selectively broadcast data to the instruction and data memories associated with one or more of the processors in FIG. 1.

FIG. 3 illustrates the structure of the control register 68 and data control register 70 within the interface 14. Bit 15 (item 110) of the control register (dtctl_$_{reg}$_we) enables indirect write access by the host processor to the data control register 70 in the interface. When bit 15 is set (i.e., bit 15=logic 1), bits 6–13 (item 112) of the control register (shdow_reg_val) are transferred into bits 0–7 (items 120*a–d* and 118) of the data control register during a host processor write cycle directed to the control register. In this sense, data control register 70 is referred to as a "shadow" register of control register 68. Bits 6–13 (item 112) of the control register are referred to herein simply as "control" bits. Bits 0–4 (item 116) of the control register 68 are reserved for future use, and have no function at present.

Although the address bus in the multi-processor integrated circuit is only 16 bits wide, the interface address register (item 66 in FIG. 2) is augmented by a 16-bit extended address register, effectively resulting in a 32-bit address range. This allows memory addresses beyond 64K to be accommodated. The value contained in the 16-bit extended address register forms the upper 16 bits of the composite 32-bit address. In the present embodiment, instruction memory addresses are mapped to the upper 16 bits of this composite address, and data memory addresses to the lower 16 bits. The selection between upper and lower portions of the address range (and therefore, between instruction and data memory) is determined by the state of bit 5 (item 114) of the control register (ext_addr). If bit 5 is set (i.e., bit 5=logic 1), the contents of the extended address register, comprising the upper 16 bits of the composite 32-bit address, are placed onto the address bus (item 88 in FIG. 2). On the other hand, if bit 5 is not set (i.e., bit 5=logic 0), the contents of the address register itself, comprising the lower 16 bits of the composite 32-bit address, are placed on the address bus. The data control register 70 directly controls the selection of subsystems 0–3 (items 18*a–d*) in the multi-processor integrated circuit. The state of select bits 0–3 (items 120*a–d*) enables pairs of write request lines to the corresponding subsystem. For example, if select bit 2 (item 120*c*) is set, then both the instruction memory write request line (item 90*c* in FIG. 2) and the data memory write request line (item 92*c* in FIG. 2) for subsystem 2 (item 18*c* in FIG. 2) are enabled. Although both lines are enabled, only one may be active at a time, depending on whether the instruction memory or the data memory is being accessed. As stated above, access to either instruction or data memory is determined by the state of bit 5 (item 114, ext_addr) in the control register 68.

The present system and method allow data to be broadcasted simultaneously to either the instruction memory or the data memory in any combination of the subsystems within the multi-processor integrated circuit. For example, if it is desired to load identical program instructions into the instruction memory of subsystems 1 and 2, the host concentrator would set control bits 6–13 (item 112, shdow_reg_val) of the control register 68 to a binary value of 0110, set bit 5 (item 114, ext_addr) to 1, and set bit 15 (item 110, dtctl_reg_we) to 1. Setting bit 15 (item 110) to 1 causes the value of bits 6–9 (item 112) to be transferred to select bits 0–3 (items 120*a–d*) of the data control register. Thus, only select bit 1 (item 120*b*) and select 2 (item 120*c*) of the data control register are set. As stated above, this enables the write request lines to either the instruction and data memory in subsystems 1 and 2 (items 90*b*, 92*b*, 90*c*, and 92*c* in FIG. 2). However, by setting bit 5 (item 114) to 1, the control register selects the instruction memory in each subsystem, rather than the data memory. Consequently, only the write request line for the instruction memory in subsystem 1 (item 90*b* in FIG. 2) and the instruction memory in subsystem 2 (item 90*b* in FIG. 2) are active during the ensuing data transfer from the host concentrator. This allows instructions to be simultaneously written by the host concentrator to both subsystems during a single write operation. An analogous procedure could be used to transfer instructions or data to the instruction memories or data memories in any combination of the subsystems at once. The logic state of the control register bits involved in data broadcasting is based on that of corresponding bits in the operand of the instruction used to write to the control register, which is issued from the host concentrator to the interface. For example, if the operand of the "write to control register" command contains a logic '1' in a designated bit position, bit 15 of the control register will be set; otherwise, it will be cleared.

The use of a shadow register in the host processor interface to coordinate data broadcasting is believed to be advantageous. First, by using the shadow register technique to indirectly program the data control register (rather than writing directly to the data control register), it is possible to avoid the addition of special "data broadcast" instructions to the interface instruction set. Recall that control register bits 6–13 are automatically transferred to the data control register whenever bit 15 of the control register is set. Thus, writing to the data control register involves no more than writing a specific value to the control register. Since an instruction already exists by means of which the host processor can address the control register in the interface, it is unnecessary to create another instruction to specifically access the data control register.

Moreover, if bit 15 of the control register is not set, shadowing is disabled—this makes it possible to modify the contents of the control register without affecting the write enable status of the memories. This allows bits 6–13 of the control register to be used as shadow bits for another register within the host processor interface. For example, a reset control register controlling the reset of the multiple processors (items 20*a–d* in FIG. 1), might operate as a second shadow register to the control register. In this case, bits 6–13 of the control register would be automatically copied into the reset control register when bit 14, for example, of the control register was set. Thus, shadowing allows a single bit field (bits 6–13) in the control register to serve multiple functions.

Note that the data control register cannot be read by the host processor, since doing so would negate the advantages of having a shadow register. Since there is no instruction for directly accessing the data control register, the only way to read the data control register bits would be by copying them to the control register and then reading the control register. However, this would destroy the previous contents of the control register, which defeats the purpose of shadowing. The fact that the data control register is not readable by the host processor is not a significant drawback, however. Once written, the contents of the data control register cannot change unless the host processor writes a different bit pattern to the control register. Thus, without directly reading the data control register, it may be assumed that it contains the last value written.

Figure 4A:
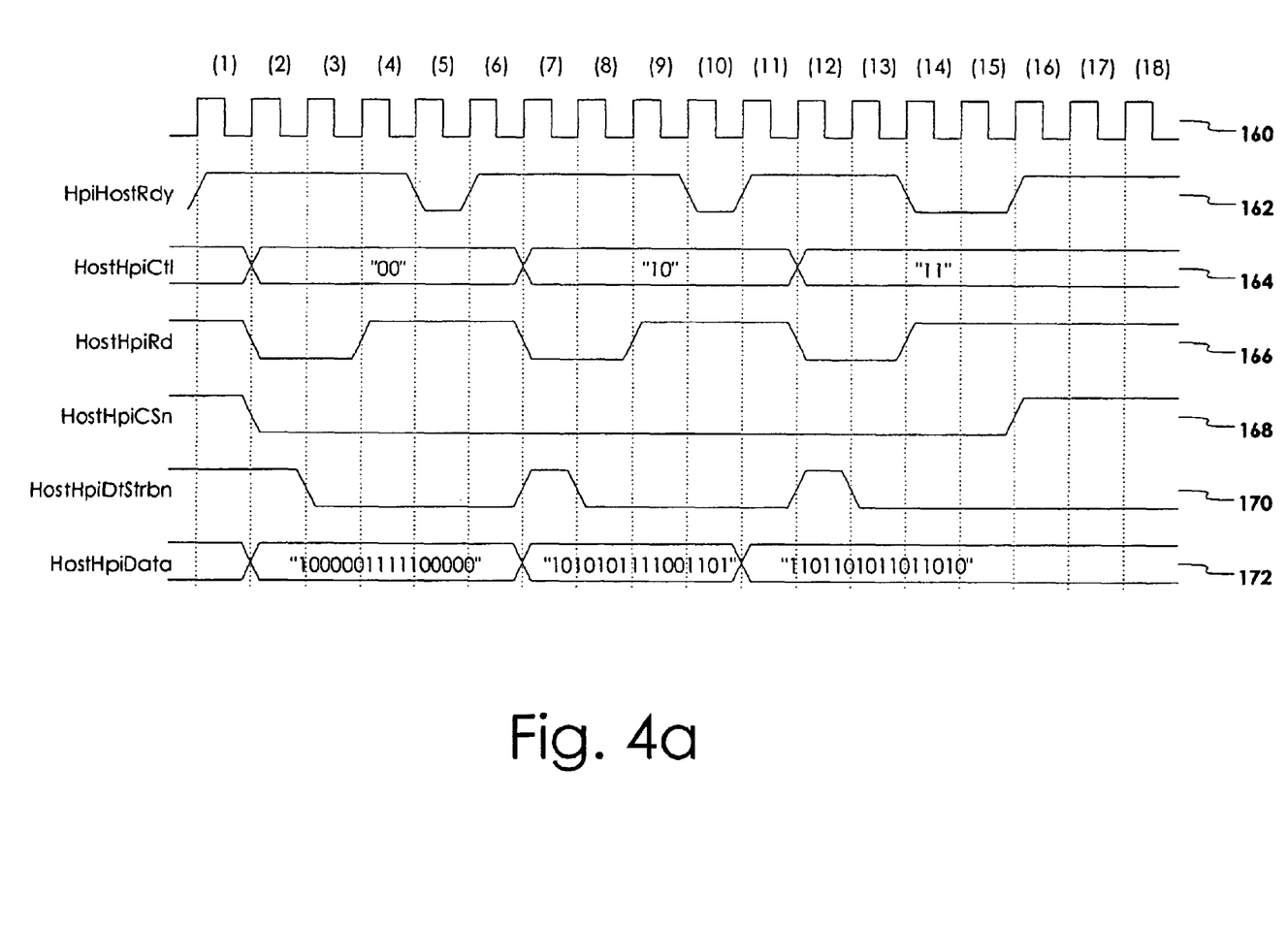
FIGS. 4a and 4b contain a timing diagram of broadcasting data to the instruction memory associated with all four of the processors in FIG. 1.
Figure 4B:
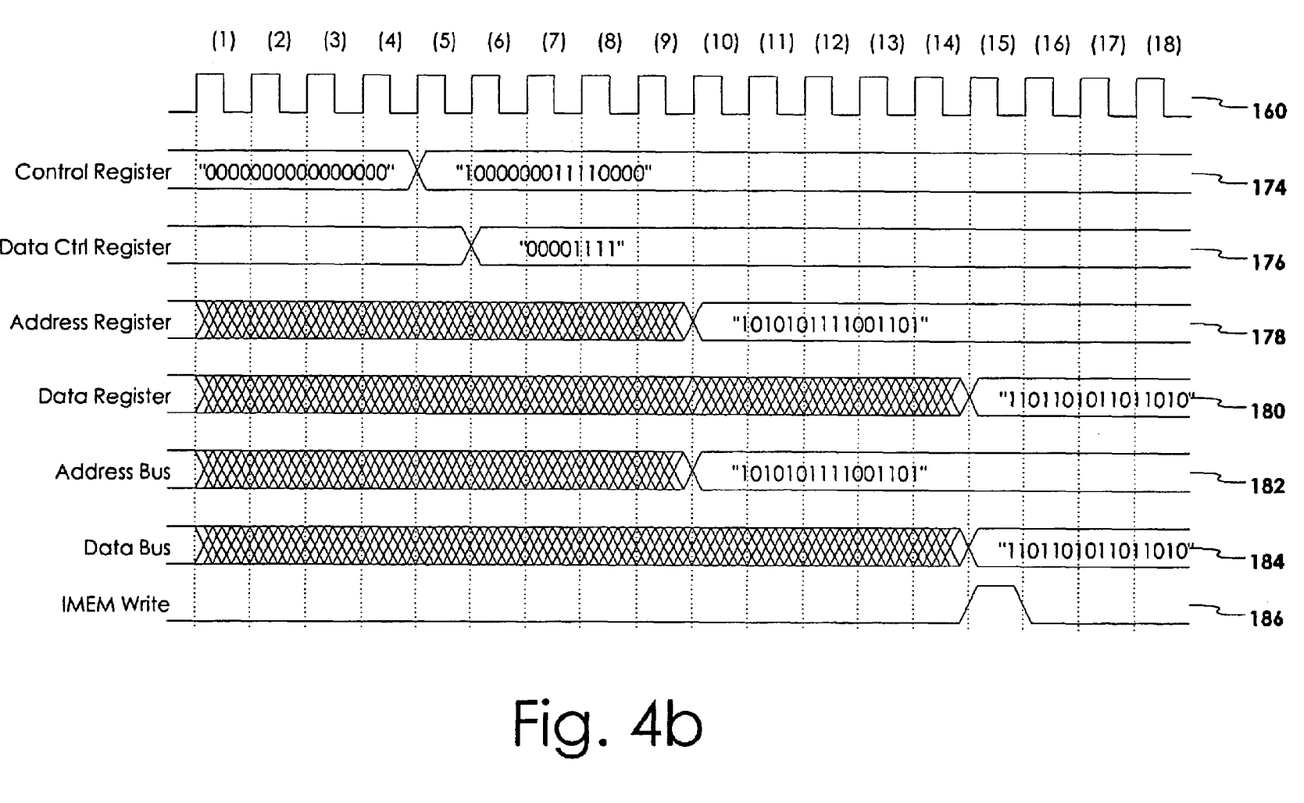

FIGS. 4*a* and 4*b* illustrate the timing of the various control and data signals involved in data broadcasting. The top row 160 in FIGS. 4*a* and 4*b* represents successive clock cycles of the interface master clock, and the rows beneath indicate the state of the interface signals during each clock cycle. The process shown in FIG. 4*a* begins (clock cycle 1) with the interface asserting HpiHostRdy 162 to indicate to the host processor that it is ready to accept a command or data. In response, the host processor transmits (clock so cycle 2) a binary value of 00 on the 2-bit control bus HostHpiCl 164. This command signifies to the interface that the host processor is about to issue a write cycle. The host also sets the HostHpiRd 166 and HostHpiCSn 168 signals to logic 0 (which is their active state). A logic 0 on HostHpiCSn 168 enables access to the interface registers, while logic 0 on HostHpiRd 166 initiates a write operation to the interface. The host processor then toggles HostHpiDtStrbn 170 (clock cycle 3) from 1 to 0 to indicate the presence of valid data (a binary value of 1000001111100000) on 16-bit data bus HostHpiData 172. On the rising edge of clock cycle 4 the data are latched as HostHpiRd 166 returns to a logic 1, and during the interval from clock cycle 5 to cycle 6, HpiHostRdy goes from logic 1 to 0, indicating that the interface is temporarily unable to respond to another write cycle.

Referring now to FIG. 4b, it can be seen that during clock cycle 5, the previous value in the control register 174 is replaced by the data from the host processor (i.e., 1000001111100000)—thus, bit 15 and bits 5–9 all assume a logic value of 1. Since bit 15 of the control register=logic 1, control bits 6–13 of the control register are copied to bits 0–7 of the data control register 176 (clock cycle 6). At the same time, the HpiHostRdy line (item 162 in FIG. 4a) returns to a logic 1, indicating to the host processor that the interface is ready to accept another command. Recall that select bits 0–3 of the data control register control the state of corresponding write request lines.

Referring again to FIG. 4a, at the beginning of clock cycle 7 the host processor issues a binary value of 10 on HostHpiCtl bus 164. This command allows the host to write to the address register in the interface (item 66 in FIG. 2). At this time, the data bus HostHpiData 172 contains a binary value of 1010101111001101. The host writes the contents of the data bus to the address register by toggling HostHpiRd 166 from 1 to 0 at the beginning of clock cycle 7. At the start of the following clock cycle (cycle 8), the host toggles HostHpiDtStbn 170 from logic 1 to 0, indicating the presence of valid data on the data bus, HostHpiData 172. And on the rising edge of clock cycle 9, HostHpiRd 166 returns to a logic 1, latching the value on the data bus into the address register. From clock cycle 10 until the start of cycle 11, the HpiHostRdy line 162 goes from logic 1 to 0, to indicate that the interface is busy; when HpiHostRdy returns to a logic 1, the interface is again able to accept a command. As seen in FIG. 4b, the address register 178 receives the contents of the data bus 172 at the start of clock cycle 10.

As soon as HpiHostRdy 162 returns to a logic 1 in cycle 11, the host places onto the HostHpiData bus 172 the data (binary value 1101101011011010) that will be written to the location contained in the address register. At the start of clock cycle 12 the host processor sends HostHpiRd 166 from a logic 1 to 0 again, to initiate a third write operation. This time, the control bus HostHpiCtl 164 contains a binary value of 11, signifying a write to the data register (item 64 in FIG. 2). On the rising edge of clock cycle 12, HostHpiDtStrbn toggles from logic 0 to 1, indicating the presence of valid data on the data bus, and then back to logic 0. When HostHpiRd 166 returns to a value of logic 1 at the start of clock cycle 14, the contents of the data bus HostHpiData 172 are latched into the interface data register. At the same time, HostHpiRdy 162 assumes a value of logic 0 from clock cycle 14 to 16, while the interface is data register is loaded from the data bus. At the start of cycle 16, the write operation is complete and HostHpiCSn 168 goes from a logic 0 back to a logic 1, as the host processor relinquishes access to the interface registers.

Referring to FIG. 4b, it can be seen that the contents of the data register 180 are placed on the data bus 184 at the start of clock cycle 15, coincident with the instruction memory write request signal 186 that actually transfers the data (binary value 1101101011011010) from the bus into a memory location (binary value 1010101111001101) in all four (since select bits 0–3 of the data control register are set) of the subsystems in the multi-processor integrated circuit. The state of the interface control and data signals remains unchanged over clock cycles 16–18. Although this example illustrates the transfer of program instructions into the instruction memories of the multi-processor integrated circuit, it should be apparent that the same process could be used to transfer data into the data memories. This might be done to provide computational data for the processors (items 20a–d in FIG. 1), or to configure the DMA controllers (items 26a–d in FIG. 1) or TDM serial ports (items 28a–d and 30a–d in FIG. 1.

The present system and method allow a host processor to transfer data to the memories of multiple internal processors in a multi-processor integrated circuit simultaneously, in a single write operation. The host processor can designate any combination of one or more of the four subsystems to which to write program instructions, configuration data, etc. It is believed that the system and method disclosed herein offer significant advantages for configuring the multiple internal processors and associated on-chip peripherals in the multi-processor integrated circuit, as is commonly done at start-up. It is typical in a multi-processor integrated circuit for the subsystems to be identically configured. Thus, the processors must all be loaded with the same instructions and the same operating parameters must be provided to the on-chip peripherals. According to present methods, the instructions and data must be separately loaded into the memory of each subsystem. However, the present system and method would allow the host processor to load the memories of all the subsystems at once, significantly shortening the time required to initialize the multi-processor integrated circuit.

It will be appreciated by those skilled in the art having the benefit of this disclosure that this invention is believed to present a system and method for broadcasting data from an external host processor to multiple processors within a multi-processor integrated circuit. Further modifications and alternative embodiments of various aspects of the invention will be apparent to those skilled in the art in view of this description. Details described herein, such as the number of internal processors or the number of bits in the internal registers, are exemplary of a particular embodiment. Certainly less or more than four subsystems and processors are contemplated. Four are shown only for the sake of brevity in the drawings. It is intended that the following claims be interpreted to embrace all such modifications and changes and, accordingly, the specification and drawings are to be regarded in an illustrative rather than a restrictive sense.

What is claimed is:

1. A computer system comprising:
    a host processor;
    a plurality of memory devices;
    an interface interposed between the host processor and the plurality of memory devices, wherein the interface comprises:
        a data control register comprising a plurality of select bits corresponding to the plurality of memory devices, and such that write access to a specific one of the plurality of memory devices is enabled if a corresponding one of the plurality of select bits is set; and
        a control register comprising a plurality of control bits corresponding to the plurality of memory devices, wherein the state of the control bits are set by the host processor to enable the control bits to be copied to the select bits.

2. The system as recited in claim 1, wherein the host processor enables write access to any combination of the plurality of memory devices by setting the corresponding control bits and then copying the control bits to the select bits.

3. The system as recited in claim 2, wherein, after enabling write access to the combination of memory devices, the host processor writes data simultaneously to the entire combination of write enabled memory devices.

4. The system as recited in claim 3, wherein each of the plurality of memory devices comprises both an instruction memory device and a data memory device, and wherein an extended memory bit in the control register selects either instruction memory devices or the data memory devices to be write enabled when the corresponding data control bits are set.

5. The system as recited in claim 4, further comprising a plurality of secondary processors such that a specific one of the plurality of instruction memory devices and a specific one of the plurality of data memory devices is coupled to each of the plurality of secondary processors.

6. The system as recited in claim 5, wherein the host processor is adapted to load the instruction memory coupled to any of the plurality of secondary processors with program instructions executable by said secondary processor.

7. The system as recited in claim 1, wherein a write enable bit within the control register enables the copying of the control bits to the select bits.

8. The system as recited in claim 1, further comprising peripheral devices, including serial ports and a direct memory access controller, operatively coupled to each of the plurality of secondary processors.

9. The system as recited in claim 8, wherein the host processor interface and the secondary processors, together with their associated memory devices and peripheral devices, all share a monolithic semiconductor substrate.

10. The system as recited in claim 1, wherein the secondary processors are digital signal processors.

11. The system as recited in claim 1, wherein the interface further comprises an instruction decoder, such that setting the state of the control bits and copying of the control bits to the select bits occur when the instruction decoder responds to a command issued by the host processor to the interface.

12. The system as recited in claim 11, wherein the command is issued solely by the host processor absent any commands issued by the interface.

13. A method for distributing data to a plurality of memory devices, the method comprising:

placing data on a data bus coupled to the plurality of memory devices;

setting at least one of a plurality of control bits within a control register, wherein each of the control bits corresponds to a specific one of the plurality of memory devices;

copying the control bits to corresponding select bits in a data control register;

activating write enable signals to the memory devices for which the corresponding control bits are set; and writing the data to those memory devices whose write enable signals are active.

14. The method as recited in claim 13, wherein the data is distributed to the memory devices by a host processor and each of the memory devices is coupled to a specific one of a plurality of secondary processors.

15. The method as recited in claim 14, wherein both an instruction memory device and a data memory device are coupled to each of the plurality of secondary processors, and wherein the method further comprises using an extended memory bit in the control register to activate the write enable signals for either the instruction memory devices or the data memory devices.

16. The method as recited in claim 13, wherein both the control register and the data control register are contained within an interface interposed between the host processor and the memory devices.

17. The method as recited in claim 16, further comprising the interface decoding commands from the host processor.

18. The method as recited in claim 17, further comprising the interface responding to a specific command by copying the control bits to the select bits, without intervention by the host processor.

19. The method as recited in claim 18, further comprising distributing to the instruction memory coupled to any of the plurality of secondary processors program instructions executable by said secondary processor.

20. A memory medium, comprising:

a first set of bits corresponding to a set of memory devices;

a second set of bits which are operable to set a corresponding set of write enable lines coupled to a respective set of memory devices; and means for operating the second set of bits solely from a host processor link coupled to but external from a monolithic substrate containing the set of memory devices.

21. The memory medium as recited in claim 20, wherein the first and second sets of bits are contained within a control register and a data control register configured within the monolithic substrate.

* * * * *